Dec. 12, 1950     W. H. CHURCHILL     2,534,105
RECEPTACLE AND CLOSURE FASTENER THEREFOR
Filed Oct. 7, 1944     3 Sheets-Sheet 1
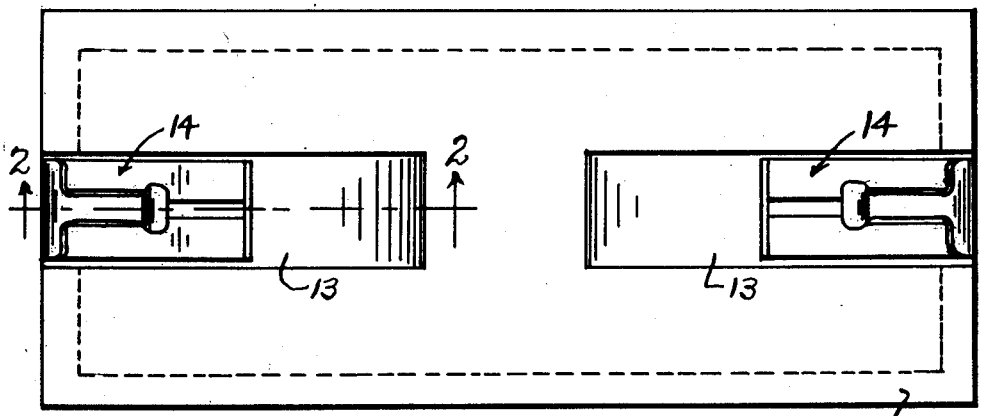
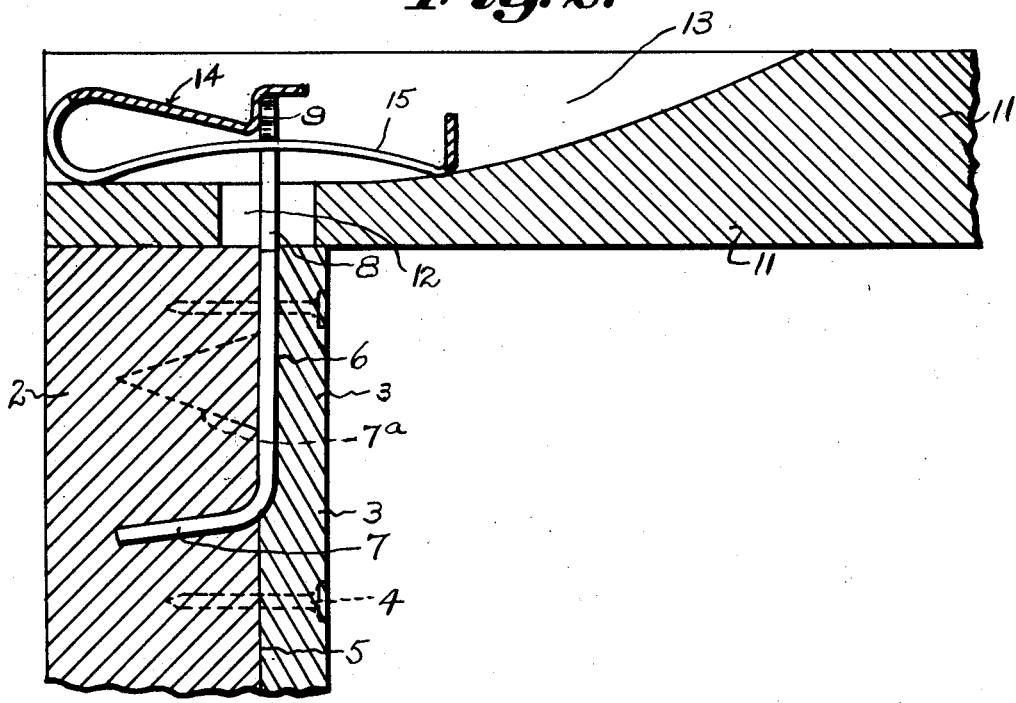
Inventor
Wilmer H. Churchill.
By Walter S. Jones
Attorney Dec. 12, 1950 W. H. CHURCHILL 2,534,105
RECEPTACLE AND CLOSURE FASTENER THEREFOR
Filed Oct. 7, 1944 3 Sheets-Sheet 2
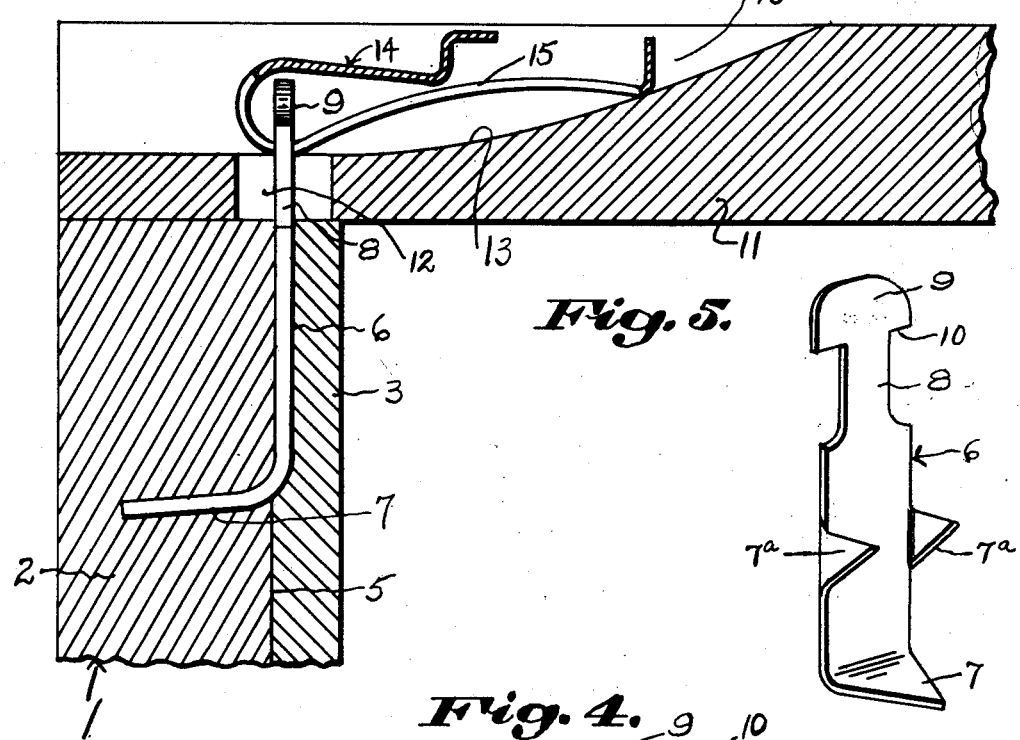
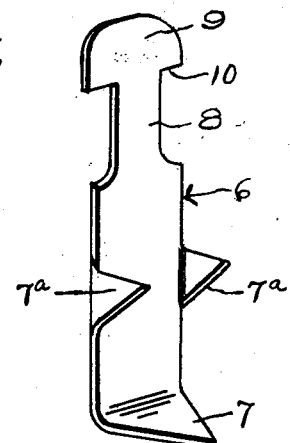
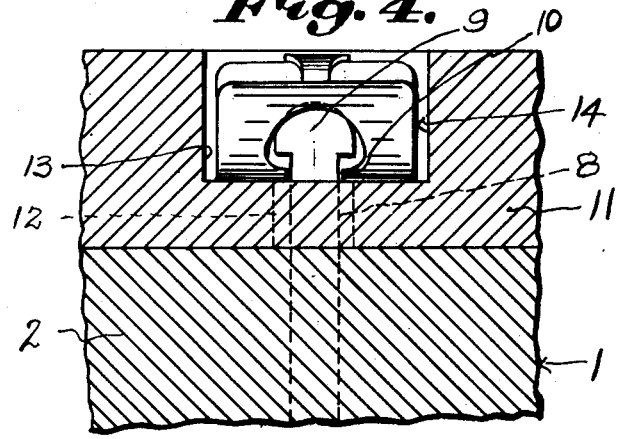
Inventor
Wilmer H. Churchill.
By Walter S. Jones
Attorney Dec. 12, 1950 W. H. CHURCHILL 2,534,105
RECEPTACLE AND CLOSURE FASTENER THEREFOR
Filed Oct. 7, 1944 3 Sheets-Sheet 3
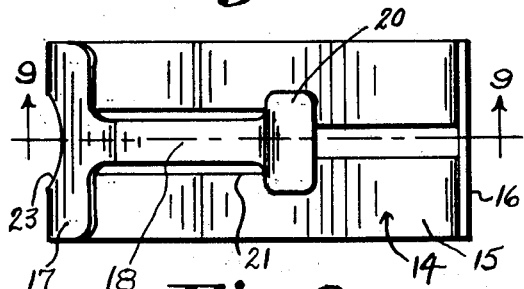
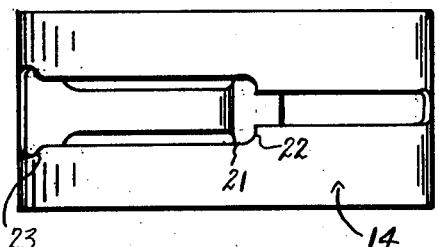
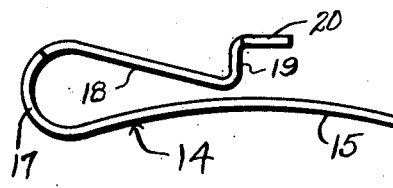
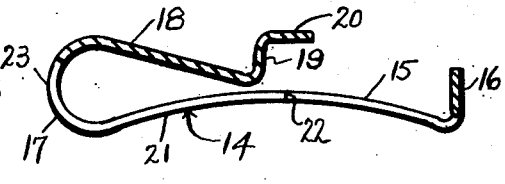
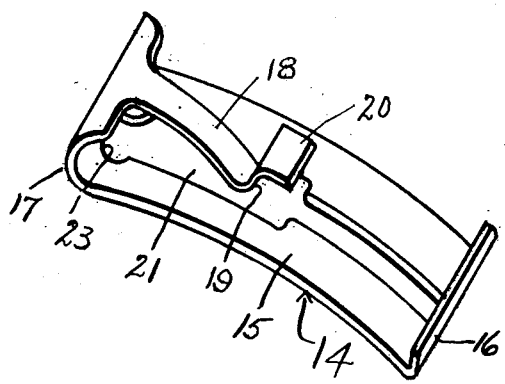
Inventor
Wilmer H. Churchill
By Walter S. Jones
Attorney Patented Dec. 12, 1950

2,534,105

UNITED STATES PATENT OFFICE 2,534,105

RECEPTACLE AND CLOSURE FASTENER THEREFOR

Wilmer H. Churchill, Saugus, Mass., assignor to United-Carr Fastener Corporation, Cambridge, Mass., a corporation of Massachusetts Application October 7, 1944, Serial No. 557,675

3 Claims. (Cl. 85—8)

The present invention relates to wooden receptacles and to closure fasteners therefor and aims generally to improve the construction of both the receptacle and fastener.

One of the objects of the invention is to provide an improved construction of wooden or like receptacles in which a stud member of a closure fastening device may be readily incorporated.

Another object of the invention is the provision of an improved closure fastener of simple construction and capable of effectively securing the closure to the receptacle in secure fastened relationship.

Other aims and objects of the invention will be apparent to those skilled in the art from a consideration of the accompanying drawings and annexed specification illustrating and describing a preferred embodiment of the invention.

In the drawings:

Fig. 1 is a top plan view of my improved receptacle with the closure fastener applied;

Fig. 2 is an enlarged vertical sectional view taken on the line 2—2 of Fig. 1, illustrating the fastener in locked position;

Fig. 3 is a similar view illustrating the fastener about to be disengaged from the stud;

Fig. 4 is a detail sectional view taken on the lines 4—4 of Fig. 3;

Fig. 5 is a detail perspective view of the stud;

Fig. 6 is a top plan view of a preferred form of fastener embodying the invention;

Fig. 7 is a bottom plan view thereof;

Fig. 8 is an edge view thereof;

Fig. 9 is a longitudinal sectional view thereof as taken on the line 9—9 of Fig. 6; and Fig. 10 is a perspective view of the fastener.

Referring further to the drawings, the invention provides an improved receptacle having side walls 1 which may include outer and inner laminations 2 and 3 of suitable material such as wood, plywood, fiber board and the like. The laminations may be secured together in any suitable manner, as for example, by nails 4, together with or without a suitable adhesive 5, as may be desired, or the adhesion only may be employed for this purpose.

The side walls 1 of the receptacle are provided with stud fastener members 6, and these may be and preferably are embedded between the laminations 2 and 3 (as shown in Figs. 2 and 4) with a portion extending above the upper free edges of the sides of the receptacle.

The stud fastener member 6 advantageously comprises a body portion formed of suitable material, preferably from a strip of thin flat sheet metal, having a bent prong or anchor 7 extending angularly therefrom, as for example from the lower end of the body, to securely anchor the stud fastener body in one of the laminations of the receptacle side walls. Similar prongs 7a may be formed along the sides of the stud body (Figs. 2 and 5) if desired. The portion of the stud fastener 6 disposed above the free edges of the side walls 1 of the receptacle preferably includes a neck portion 8 and an enlarged head 9, which is preferably provided with shoulders 10 adjacent the neck 8.

The receptacle top 11 may be of any suitable material and is preferably of a size to overlie the upper free edges of the receptacle side walls 1, as shown in Figs. 1 and 2. The top 11 is provided with a plurality of apertures or openings 12 near the periphery thereof and of a size to permit the passage of the stud head 9 therethrough. The thickness of the apertured section of the top 11 is advantageously greater than the length of the stud neck 8, and this may be less than the thickness of the top as a whole, as in the case when the upper surface of the top is grooved or recessed as at 13 for the reception of the stud-receiving fastener element 14.

The stud-receiving fastener member may be of any approved design and preferably is of the type adapted to engage and lock with the stud 6 by a lateral sliding movement. Accordingly, the recess 13 is preferably elongated and is open at the edges of the cover 11.

The stud-engaging fastener member 14 in the illustrated form shown in Figs. 6 to 10 inclusive, is preferably formed of a single piece of resilient material, such as resilient sheet metal, to provide an outwardly arched base 15, slotted throughout a substantial portion of its length and joined by a tail piece 16 at one end. The opposite end of the fastener may be formed as a bight portion 17 having an inwardly extending resilient strip 18 formed with a stop 19 adapted to engage a side face of the stud 6 and a manipulating or handle portion 20 by means of which the stop 19 may be released from engagement with the stud head. The arched base 15 preferably is formed with a longitudinal slot 21 from the bight end 17 inwardly to a point 22 past the stop 19 equal to the thickness of the stud to limit lateral sliding movement of stud-engaging fastener member 14 relative to the stud. The slot 21 is of a width to receive the neck 8 of the stud 6, and the bight portion 17 may be formed with an enlarged opening 23 communicating with the slot 21 to receive the enlarged head 9 of the stud.

In order to increase the resilience of the base 15, it may be slotted through substantially its entire length, i. e. from the bight 17 to the tail piece 16, in which case the portion of the slot 21 rearwardly of the point 22 is narrower than the portion forward thereof, so as to form shoulders at the point 22 acting as limiting stops for lateral sliding movement of the stud-receiving fastener member 14 over the stud 6.

In use the receptacle cover 11 is placed upon the free upper edges of the receptacle side walls 1 with the stud neck 8 extended through the opening 12 and the stud head 9 disposed in the recess 13 above the bottom face thereof.

The stud-engaging fastener member 14 is then engaged with the stud 6, as illustrated in Fig. 3, by moving the fastener member 14 laterally in the recess to cause the stud head to enter the enlarged opening 23 in the bight portion 17. Continued lateral movement presents the stud head 9 over the arched base 15 and under the resilient strip 18, with the shoulders 10 of the stud head 6 engaging the outer faces of the base 15 on opposite sides of the slot 21. The limit of the lateral sliding movement of the fastener member 14 is determined by the stops at the point 22, which preferably is at the bight point of the arch of the base, so that the base is under tension bearing against the shoulders 10 of the stud head 9 and at spaced points against the cover 11.

Accidental removal of the fastener member 14 is prevented by the resilient strip 18, which during the above described movement has ridden over the head of the stud and snapped into locking engagement therewith, with the stop face 19 engaging a face of the stud head 9 opposite the slot shoulders at the point 22. The stud 6 is thus securely locked between the limiting shoulders of the slot 21 and the stop face 19.

To remove the cover 11 from the receptacle, the handle portion 20 of the resilient strip 18 is lifted to position the stop face 19 above the head, in which position the stud-engaging fastener member 14 may be moved inwardly of the cover recess 13 (to the right as viewed in Fig. 2).

It will be apparent that the stud 6 need not be embedded between laminations of the box side walls 1, but may be securely attached to either the inner or outer faces of the side walls, where a cheaper and less secure structure is desired, Also, in cases where there is no objection to the exposure of the stud-engaging fastener part 14 above the upper surface of the cover 11, the cover need not be provided with the fastener-receiving recesses 13. Other changes may be made without departing from the spirit of the invention.

Furthermore my invention is not to be restricted to the specific form of fastener shown in the drawings, as the scope thereof is best defined in the appended claims.

I claim:

1. A fastener for boxes and the like comprising a stud member and a cooperating female fastener member; said stud member comprising an elongated body provided with means for mounting it on a panel of a box, a head at one end of said body, a reduced neck portion connecting said head to said body adapted for extending through an aperture of a cover panel of a box, and shoulders on said head adjacent said neck portion; said female fastener member being formed from resilient strip material and comprising an elongated bowed base portion provided with surfaces at its ends for engaging a cover panel of a box, an elongated stop portion overlying said base portion, and a bight portion connecting one end of said stop portion to an adjacent end of said base portion, said bight portion having an aperture adjacent said base portion proportioned for receiving said head of said stud member, said base portion being formed with a longitudinal slot extending from said aperture in said bight portion and provided with an end wall of said slot intermediate the ends of said base portion, said slot being proportioned to permit the passage of said neck portion along said slot to said end wall while said shoulders slidably engage the surface of said base portion adjacent said slot, and said stop portion extending angularly toward substantially the center of said base portion and providing a surface opposite said base portion for slidable engagement with the head of said stud member during the passage of said stud member along said slot and an end surface at its free end facing said end wall of said slot providing means whereby said stud member may be retained in engagement with said female fastener member.

2. A fastener for boxes and the like in accordance with claim 1 wherein the body of the stud member is provided with a prong for penetrating secured engagement with a panel of a box.

3. A fastener installation comprising a stud member, a cooperating female fastener member, a supporting panel, and a cover panel to be fastened angularly to an edge of said supporting panel; said stud member comprising a flat elongated body secured to a face of said supporting panel, a reduced neck portion extending from one end of said body beyond an edge of said supporting panel, and a head at the end of said neck portion with shoulders adjacent said neck portion; said cover panel having one face in abutting relation with said edge of said supporting panel and being provided with an aperture through which extends the neck portion of said stud member and a groove on the face opposite said one face extending in a direction substantially normal to the plane of said supporting panel and intersecting said aperture; and said female fastener member being formed from resilient strip material and comprising an elongated bowed base portion, an elongated stop portion overlying said base portion, and a bight portion connecting one end of said stop portion to an adjacent end of said base portion, said bight portion having an aperture adjacent said base portion proportioned for receiving said head of said stud member, said base portion being formed with a longitudinal slot extending from said aperture in said bight portion and provided with an end wall of said slot intermediate the ends of said base portion, said slot being proportioned to permit the passage of said neck portion along said slot to said end wall while said shoulders slidably engage the surface of said base portion adjacent said slot, said base portion being disposed longitudinally within said groove with the ends of said base portion in tensioned, longitudinally, slidable engagement with the base of said groove and with the shoulder of said head in tensioned engagement with surfaces of said base portion adjacent said slot end wall, and said stop portion extending angularly toward said base portion and providing a surface opposite said base portion for slidable engagement with the head of said stud member during the passage of said stud member along said slot and an end surface at its free end facing said end wall of said slot, said end surface and said end wall of said slot being in opposed relation to opposite sides of said stud member.

WILMER H. CHURCHILL.

REFERENCES CITED

The following references are of record in the file of this patent:

UNITED STATES PATENTS

| Number | Name | Date |
|---|---|---|
| 255,013 | Oleson | Mar. 14, 1882 |
| 293,138 | Bleike, Jr | Feb. 5, 1884 |
| 313,857 | Dunn | Mar. 17, 1885 |
| 389,285 | Bradley | Sept. 11, 1888 |
| 394,320 | Wotruba | Dec. 11, 1888 |
| 481,801 | Meloney et al. | Aug. 30, 1892 |
| 487,667 | Dietz | Dec. 6, 1892 |
| 717,813 | Colman | Jan. 6, 1903 |
| 844,048 | Schaffner | Feb. 12, 1907 |
| 874,688 | Lee | Dec. 24, 1907 |
| 996,847 | Gavin | July 4, 1911 |
| 1,139,316 | Valkenburgh | May 11, 1915 |
| 1,348,767 | White | Aug. 3, 1920 |
| 1,459,966 | Anderson | June 26, 1923 |
| 1,597,090 | McIlreevy | Aug. 24, 1926 |
| 1,598,401 | Sparrow | Aug. 31, 1926 |
| 1,764,950 | Griner | June 17, 1930 |
| 1,872,655 | Blakeslee | Aug. 23, 1932 |
| 1,909,345 | Green | May 16, 1933 |
| 2,013,763 | Olsen | Sept. 10, 1935 |
| 2,037,025 | Hoyt | Apr. 14, 1936 |
| 2,078,453 | Miller | Apr. 27, 1937 |
| 2,133,621 | Klein | Oct. 18, 1938 |
| 2,203,397 | Taylor | June 4, 1940 |
| 2,358,890 | Tinnerman | Sept. 26, 1944 |

FOREIGN PATENTS

| Number | Country | Date |
|---|---|---|
| 384,451 | Great Britain | Dec. 8, 1932 |
| 478,395 | France | Sept. 18, 1915 |